United States Patent
Goodwin et al.

(10) Patent No.: US 11,294,858 B2
(45) Date of Patent: Apr. 5, 2022

(54) METHOD AND SYSTEM FOR FLEXIBLE, HIGH PERFORMANCE STRUCTURED DATA PROCESSING

(71) Applicant: Anditi Pty Ltd, Teralba (AU)

(72) Inventors: Andrew Goodwin, Sydney (AU); Patrick Poissant, Fennell Bay (AU); Shaileshkumar Lathiya, Elermore Vale (AU); Peter Jamieson, Bolton Point (AU); Stephen Craig, New Lambton (AU)

(73) Assignee: Anditi Pty, Ltd., Teralba (AU)

( * ) Notice: Subject to any disclaimer, the term of this patent is extended or adjusted under 35 U.S.C. 154(b) by 177 days.

(21) Appl. No.: 16/313,830

(22) PCT Filed: Jun. 23, 2017

(86) PCT No.: PCT/AU2017/050641
§ 371 (c)(1),
(2) Date: Dec. 27, 2018

(87) PCT Pub. No.: WO2018/000024
PCT Pub. Date: Jan. 4, 2018

(65) Prior Publication Data
US 2019/0171617 A1 Jun. 6, 2019

(30) Foreign Application Priority Data

Jun. 28, 2016 (AU) .................................. 2016902533
Nov. 15, 2016 (AU) .................................. 2016904659

(51) Int. Cl.
*G06F 16/13* (2019.01)
*G06F 16/25* (2019.01)
*G06F 9/50* (2006.01)

(52) U.S. Cl.
CPC ............ *G06F 16/13* (2019.01); *G06F 16/258* (2019.01); *G06F 9/5027* (2013.01)

(58) Field of Classification Search
CPC .. G06F 16/13; G06F 16/24542; G06F 16/258; G06F 16/29; G06F 9/5027
See application file for complete search history.

(56) References Cited

U.S. PATENT DOCUMENTS 7,139,779 B1 * 11/2006 Kornelson ............ G06F 16/283
8,326,037 B1 * 12/2012 Abitz .................... G06K 7/1443
382/181

(Continued)

FOREIGN PATENT DOCUMENTS

WO        2018/000024 A1      1/2018

OTHER PUBLICATIONS

WIPO, Priority Document for Australian Patent Application No. 2016902533, filed Jun. 28, 2016.

(Continued)

*Primary Examiner* — Jay A Morrison
(74) *Attorney, Agent, or Firm* — SoCal IP Law Group LLP; Steven C. Sereboff

(57) ABSTRACT

Described herein is a method and system for flexible, high performance structured data processing. The method and system contains techniques for balancing and jointly optimising processing speed, resource utilisation, flexibility, scalability, and configurability in one workflow. A prime example of its application is the analysis of spatial data, e.g. LiDAR and imagery. However, the invention is applicable to a wide range of structured data problems in a variety of dimensions and settings.

10 Claims, 8 Drawing Sheets

(56) References Cited

U.S. PATENT DOCUMENTS

| | | | | |
|---|---|---|---|---|
| 10,285,611 | B1* | 5/2019 | Harlev | A61B 5/339 |
| 2013/0086215 | A1* | 4/2013 | Trotta | H04L 29/08072 |
| | | | | 709/217 |
| 2013/0173631 | A1* | 7/2013 | Roe | G09B 29/003 |
| | | | | 707/741 |
| 2015/0261860 | A1* | 9/2015 | Mittal | G06F 16/951 |
| | | | | 707/722 |

OTHER PUBLICATIONS

WIPO, Priority Document for Australian Patent Application No. 2016904659, filed Nov. 15, 2016.
Australian Patent Office, ISA, International Search Report for PCT Application No. PCT/AU2017/050641, dated Sep. 28, 2017.
Australian Patent Office, ISA, Written Opinion of the International Searching Authority for PCT Application No. PCT/AU2017/050641, dated Sep. 28, 2017.

* cited by examiner (Prior art)

METHOD AND SYSTEM FOR FLEXIBLE, HIGH PERFORMANCE STRUCTURED DATA PROCESSING

FIELD OF THE INVENTION

The present invention relates to data processing and in particular to a method of processing structured data. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Strong advances in computing, communications, and data acquisition technologies are being widely adopted around the world across multiple domains leading to an explosion in available data, so called "big data", and level of analytics undertaken using this data. These massive data streams and datasets harbour enormous potential value, but their management, processing, and visualisation have become, and will continue to be, a major challenge as acquisition capabilities continue to outpace those in analytics. Along with the sheer volume of data, the handling and analysis of which in itself is a formidable task, there is the need to adapt to a wide variety of scenarios and rapid, often unpredictable change. For example, variations exist across data types, formats, intended applications, and computing capabilities that are not static in time and are in general difficult to predict.

The inventors have recognized a need for a solution that can combine high computing speed and resource utilisation with the flexibility to adapt to the data analysis needs and available computing capabilities in any given scenario. It should have the ability to process all the data that informs the analysis, not be forced to decimate the dataset purely to reduce size, and be easily adaptable to new scenarios without the need for extensive manual reconfiguration or further development. It should constitute a computing analysis framework that can read, index, cleanse, analyse, and output multiple dimensional data having a range of sources, types, and formats in a highly configurable and highly computationally efficient workflow.

An important distinction in this context is that between structured and unstructured data. Most data captured today is unstructured. One of numerous examples of structured data is spatial data such as that obtained from LiDAR (Light Detection and Ranging) and aerial or georeferenced imagery (just referred to as "imagery" below). Addressing structured and unstructured data problems in an optimal way requires different approaches. In unstructured datasets the key challenge is to find meaningful patterns and trends, i.e. structure, in the huge quantities of seemingly random data. Large structured datasets can be more efficiently stored, handled, and analysed as the structure is well-defined, but they present the same fundamental challenges in terms of management, processing, and visualisation described above.

Interestingly, structured data is increasingly being stored in an unstructured way for reasons of scale and flexibility. For example, systematically recorded numerical values are being stored in XML or JSON. These data storage methods have provided flexibility at the expense of efficient storage and indexing. High performance computing techniques require compact data structures and highly optimised data access through the use of specialised indexing methodologies. Such datasets present an opportunity for a user or system to re-impose structure, increasing the efficiency of subsequent analytical processes. This structured data that is stored in an unstructured way is generally referred to as semi structured data. However, for the purposes of this invention, semi structured data is considered as structured data as it is able to be efficiently processed by the present invention.

Software solutions for processing and storing vast quantities of unstructured data are not well-suited to the fundamentally different problem of jointly optimising processing speed, resource utilisation, flexibility, scalability, and configurability in large, structured datasets.

Existing solutions for the structured big data problem, e.g. in the spatial domain, known to the inventors suffer from one or more of the following drawbacks:

- They cannot adapt and jointly optimise processing speed, resource utilisation, flexibility, scalability, and configurability. They are at best optimal in one or a subset of these parameters at the expense of the others.
- They may require multiple programs and multiple input/output functions to make up a complete system, for example in a pipeline approach, instead of having all required functionality in the one fully integrated package.
- They may not be platform agnostic, nor able to capitalise on advances in computing technology such as supercomputers and the cloud without significant re-design of the overall system architecture.
- They may not be scalable to massive dataset size and therefore demand simple thinning or dissociation of large datasets, which reduces dataset integrity, fidelity, and value, and increases processing times and related resource demands.
- They may not be able to utilise all computing resources that might be available—be it smartphones, laptops, desktops, servers, or supercomputers—nor automatically adapt to different memory, processing, operating system, and network configurations.
- They may not be easily reconfigurable to respond to the needs of new applications, new algorithms, new insights, new data formats, and incorporation of $3^{rd}$ party code, nor be conducive to rapid prototyping with simple GUI-based handling.

All of the above aspects are interdependent when seeking to provide an optimised structured big data solution. The inventors have identified a need to address at least some of the above drawbacks for next generation computing platforms.

SUMMARY OF THE INVENTION

The preferred embodiments of the invention disclosed herein outline a method and system for flexible, high performance structured data processing. The method and system provides techniques for balancing and jointly optimising processing speed, resource utilisation, flexibility, scalability, and configurability in one workflow. A prime example of its application is the analysis of spatial data, e.g. LiDAR and imagery, which will be used as an exemplary embodiment in the description below. A person skilled in the art, however, will readily appreciate the applicability of the solution to a wide range of structured data problems in a variety of dimensions and settings.

In accordance with a first aspect of the present invention there is provided a method for processing structured data that is stored as a dataset including a plurality of discrete data files, the method including:

accessing a data source where the structured dataset is stored;

pre-processing the dataset to generate:
(a) a reference file indicating one or more predetermined characteristics of the data that are contained within each of the discrete data files; and
(b) a metadata file indicating one or more data metrics; and upon selection of data to process from the structured dataset:
defining plugin connections for processing the selection of data;
dynamically allocating data processing tasks to connected computer nodes; and
performing data processing on the selection of data; and
generating an output of the data processing of the selection of data.

In one embodiment the step of pre-processing the dataset occurs in conjunction with indexing the dataset.

In one embodiment the predetermined characteristics include data bounds and associated file names for each of the discrete data files in the dataset.

In one embodiment the method includes the step of pre-classifying the discrete data files to calculate one or more data metrics. In one embodiment the pre-classifying the discrete data files includes obtaining complementary information from an external data source. The data metrics may include area metrics of the discrete data files. The data metrics may also include a likelihood of the presence of certain data features in a discrete data file. The data metrics may also include a point density of the data within a discrete data file. The data metrics may include a standard deviation of the data within a discrete data file.

In one embodiment the step of pre-processing the dataset includes the steps:
i) opening each discrete data file;
ii) determining the data bounds for each discrete data file; and
iii) storing the determined data bounds and an associated filename for each discrete data file in the reference file.

In some embodiments the structured dataset is a dataset of spatial data. In one embodiment the spatial data includes point cloud data derived from LiDAR. In another embodiment the spatial data includes imagery data. In a further embodiment the spatial data includes point cloud data derived from imagery.

In some embodiments the structured dataset is a dataset of time series data.

In some embodiments the method includes the steps of, upon a request to process a selection of data from the structured dataset:
a) reading the reference file; and
b) for a given data area indicative of the selection of data:
i) reading the data bounds corresponding to the given data area;
ii) comparing data bounds of the discrete data files with the data bounds of the given data area; and
iii) reading the discrete data files that at least partially overlap with the given data area.

In some embodiments the method includes the step:
performing automatic edge effect elimination on the selection of data.

In one embodiment the automatic edge effect elimination includes calculating a minimum required extra buffer of data at each plugin. Preferably the automatic edge effect elimination includes calculating, at each plugin, a total buffer of all downstream plugins In some embodiments the plugin connections are polymorphic plugin connections. Preferably an output of at least one of the polymorphic plugin connections is a derived type of the input to that polymorphic plugin connection.

In accordance with a second aspect of the present invention there is provided a method of pre-processing a dataset including a plurality of discrete data files distinguished by data bounds, the method including:
a1) creating a reference file;
a2) opening the discrete data files;
a3) determining the data bounds for each discrete data file; and
a4) storing the data bounds in the reference file together with an identifier of the discrete data file.

Preferably, wherein, upon a request to process a selection of data from the dataset by a user, a computer processor is able to:
b1) read the reference file;
b2) read the data bounds corresponding to the selection of data;
b3) compare data bounds of the discrete data files with the data bounds of the selection of data; and
b4) read the discrete data files that at least partially overlap with the data bounds of the selection of data.

In accordance with a third aspect of the present invention there is provided a method of pre-classifying a dataset including a plurality of discrete data files distinguished by data bounds, the method including:
a1) creating a metadata file;
a2) opening the discrete data files;
a3) dividing the dataset into predefined data cells and determining at least one data metric for each of the data cells; and
a4) storing the at least one data metric in the metadata file in association with an associated data cell identifier for each data cell and an identifier of the discrete data file(s) associated with each data cell.

The at least one data metric may include a measure of likelihood that the data of an individual data file includes specific spatial, temporal or spectral features. The at least one data metric may also include a measure of quality of the data within an individual data file.

In some embodiments the at least one data metric is used as an input to subsequent workflow distribution control when processing the dataset.

In some embodiments the at least one data metric is used to estimate the computation and RAM requirements during a task distribution process.

In some embodiments the at least one data metric is used to facilitate a dynamic selection of algorithms and parameter settings during classification of the dataset.

In accordance with a fourth aspect of the present invention there is provided a method of allocating computer resources to a data processing operation on a dataset, the method including:
pre-processing the dataset to generate a metadata file including characteristics of the dataset;
dividing the dataset into a plurality of work units, each work unit indicative of a subset of the data contained in the dataset;
creating a list of work units of a predetermined size based on the characteristics of the dataset;

calculating the computational complexity of each work unit based on the size of work units and characteristics of the dataset;

determining memory requirements for each work unit;

determining available memory of connected computer nodes; and allocating work units to connected computer nodes for processing based on available memory and the number of processes running.

In one embodiment the step of merging or subdividing work units is based on available memory of one or more connected computer nodes.

In accordance with a fifth aspect of the present invention there is provided a method of reducing edge effects during processing of a dataset, the method including:

determine a workflow sequence including a plurality of algorithms interconnected by one or more workflow paths, each workflow path having a plurality of workflow stages in a direction of process flow;

determining a minimum required data buffer size for each algorithm in the workflow sequence; and defining tasks for each algorithm such that the output of each algorithm has a buffer size equal to or greater than the largest sum of required buffer sizes for algorithms in a downstream workflow path.

In one embodiment the buffer size of an algorithm is equal to the largest sum of required buffer sizes for algorithms in a downstream workflow path.

In accordance with a sixth aspect of the present invention there is provided a method of performing automatic workflow distribution control in a plugin-based architecture, the method including:

identifying distributed connections wherein a first plugin having an output list of items of an object is connected to a second plugin having an individual item input of the same object; and for each distributed connection:

creating a list of tasks to process based on the list of items;

identifying compute nodes to process the list of items in a distributed manner.

In accordance with a seventh aspect of the present invention there is provided a computer system configured to perform a method according to any one of the preceding aspects.

In accordance with an eighth aspect of the present invention there is provided a non-transient carrier medium configured to maintain instructions that, when the carrier medium is read by a computer, the computer carries out a method according to any one of the first to sixth aspects.

DEFINITIONS

Throughout this specification, the following terms are intended to be interpreted with the following meanings:

Structured data: Data organised into a predefined or predictable data structure based on predefined rules or constraints. Structured data are typically presented in a format such that an algorithm having knowledge of the associated rules or constraints can obtain or easily predict the data structure and extract the relevant data. In contrast, unstructured data do not have a predefined or easily predictable structure and/or are not defined based on predefined rules or constraints. Formatted digital image data such as JPEG format data represents a simple example of structured data as it represents an array of pixel data organised according to the two dimensional relative spatial positions of CCD sensors in a digital camera. Hence, the image data is organised based on spatial position. Other examples of structured data include relational databases and spreadsheets. As mentioned above the terms 'structured data' also includes what is traditionally referred to as semi structured data. Semi structured data include datasets having some limited structure or structured data stored in an unstructured way. Tags or other types of markers are used to identify certain elements within the data, but the data does not have a rigid structure. In the broadest sense, the present invention is applicable to datasets that are "indexable" in some way.

Plugin: A discrete element executing a very specific task or algorithm.

Output: A specific data object or list of data objects produced by a plugin.

Input: A specific data object or list of data objects fed into a plugin.

Connection: The link between output and input that attaches plugins to each other.

Workflow: A set of connected plugins.

Processing controller. A computer/process that runs the software and executes the main workflow.

Compute node: A computer/process that runs the software and executes a workflow sent from the processing controller.

Data area: A subset of a complete dataset.

BRIEF DESCRIPTION OF THE DRAWINGS

Preferred embodiments of the disclosure will now be described, by way of example only, with reference to the accompanying drawings in which.

DETAILED DESCRIPTION

System Overview

Figure 1:
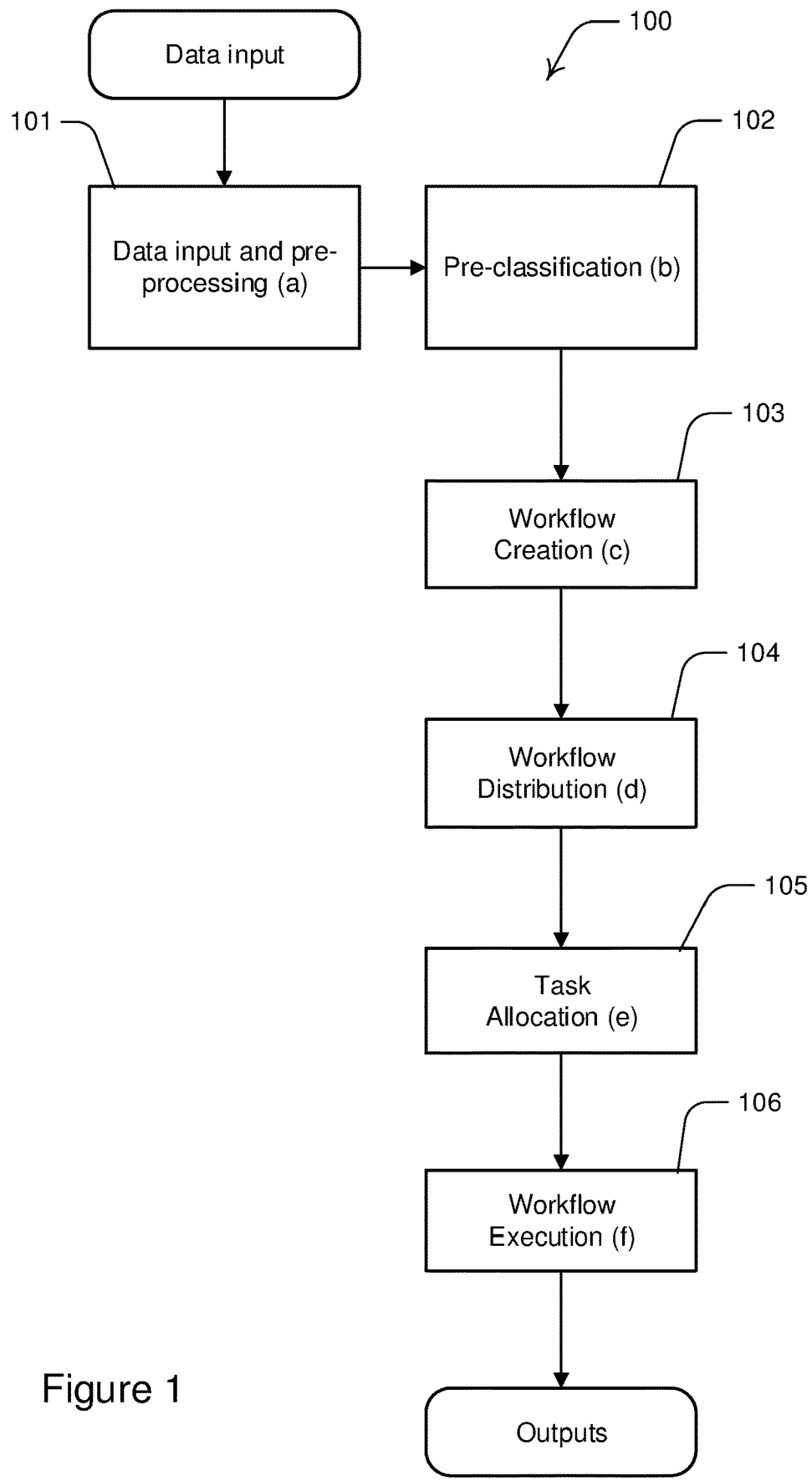
FIG. 1 is a flow diagram outlining the primary steps in a method of processing structured data including six interrelated, synergistic, and novel steps.

The method and system for flexible, high performance structured data processing allows a user to compose a processing workflow by creating a complex algorithm or suite of algorithms from smaller units called plugins. These plugins communicate by passing data objects between themselves to form a directed data flow graph. The data flow graph may fork and re-join an arbitrary number of times and generate output at any stage. Special links in the graph denote a distributed link, and a large problem may be processed by distributing the computational load at strategically selected graph junctions.

Described below is a method for efficiently processing structured data that is stored as a dataset including a plurality of discrete data files. The method is comprised of six interrelated, synergistic steps of functional components, illustrated schematically in method 100 of FIG. 1, that together constitute a significant leap forward over prior art techniques for structured or semi structured data processing, for example in the spatial domain. They are outlined in detail in the sections that follow.

Efficient Data Reading and Pre-Processing within a Specific Area from a Very Big Dataset Initially, at step 101 of method 100, an input structured dataset is read from a data source and pre-processed. An input dataset represents an entire dataset from which data of interest can subsequently be read and processed for a particular purpose. In the case of spatial data, an entire dataset may represent a spatial area of data relating to observations made by a particular instrument/system such as a satellite or airborne or mobile LiDAR system. The data of interest then represent a subset of that entire dataset selected based on a geographical area to observe and/or a time of observation if multiple observations of that area are obtained. In the case of time series data, the data of interest may represent a subset of the entire dataset selected based on a specific time period. The data source may be a locally connected or remotely located database, file system or data server, or combinations thereof co-located or located at different spatially separated locations.

The size of structured datasets being collected is increasing at an exponential rate and, as a consequence, these datasets are normally spread across a number of files and processed piecewise. In the case of spatial data, the datasets are typically divided into small spatial data areas and stored in the data source as separate files based on spatial area. Similarly, datasets of time series data are typically divided into small temporal periods and stored in the data source as separate files based on the temporal period. The separate files can then be accessed and processed piecewise. Traditionally the quantum of data that is processed by each subsystem is equal to the amount of data in each individual file. This can be problematic because file size needs to be decided before the dataset is stored in a data source, but the optimal sizing for subdivision for distributed analytical computing purposes is dependent on the characteristics of the available processing hardware and the nature of the data and tasks to be performed. Reading data from a specific area that does not correspond to the individual file subdivisions represents unique problems.

To allow a user or computer to determine where in the dataset specific data are located, the collection of files is typically indexed and one or more index files is stored in conjunction with the data files. Traditional file based indexes comprise one small index file that relates to each larger dataset file. As the number of larger files grows, so does the number of small index files. Each of these data files may need to be read in order to construct a single desired "task" or "work unit" of data from the overall dataset. This means that the number of file reads for a large processing job becomes: n (number of work units)×m (number of larger files on disk). High performance computing systems are often not well optimised for a big number of small file reads.

Additionally, dataset files are generally stored on network drives. This brings network latency issues into file IOs (input/output), which further degrades reading performance. In case of high network load, the performance can quickly become unacceptable. In highly distributed computing environments, often there are a number of compute nodes trying to read data from the same dataset which further slows down file IO operations.

To address the above deficiencies, at step 101 of FIG. 1, the input structured dataset is read and pre-processed in an efficient manner as follows. In particular, where the dataset comprises a number of separate files, the following two step procedure is performed. Step 1 relates to pre-processing the dataset to optimise it for subsequent analysis. Step 2 represents the data reading for performing analysis on a selected subset of the data.

Part 1: Generate a Reference File
  Step 1: Pre-process the dataset.
    1. For each file in the dataset:
       a. Open file—a particular file is selected and opened for reading.
       b. Read data bounds—the boundary values of the data contained within the file are extracted.
       c. Check the data bounds are correct—the boundaries of the data contained within the header of the file are compared with the actual values found in the file.
       d. Store filename-bounds key-value pair into a suitable data structure—the data bounds for that file are associated with the filename and these two values are stored as a key-value pair in a suitable data structure such as a hash table.
       e. Close file—that particular data file (and associated index file) is closed.
    2. Repeat step 1 for each data file in the dataset and populate the data structure.
    3. Store the data structure into a reference file. The reference file (such as a cache file) is used as a single point of reference for subsequent analysis of the data contained within the dataset.
  Step 2: At data reader side:
    1. Read contents from reference file into data structure only once—the reference file contents are extracted into a local data structure for reference by the client.
    2. For a given area of spatial data to be observed (or other desired subset of data having predefined bounds):
       a. Read key-value pair from data structure—terminate the loop if no more key-value pairs are available and flag appropriate error message.
       b. Check whether given area overlaps with data bounds value—identify whether the data bounds for the file falls wholly or partially within the given area.
       c. If they overlap, use the corresponding key, which is a filename, for reading—designate that file as a file containing data within the given area.
       d. If they do not overlap, go to step 2.a—ignore files containing no data within the given area.

Part 2: Generate a Metadata File

The output of Part 2 is a file called a "metadata file" for the particular dataset. In the specific example of LiDAR data, in this pre-processing step, the entire dataset is divided into cells. Each cell contains a logical identifier, flight path ID(s) and for each flight path ID a number of data points in that cell. The element density of the dataset is calculated and stored in the metadata file as well. More generally, for other types of data such as time series data, the metadata file is populated with various metrics about the specific data being processed. The metadata file is separate to the reference file mentioned above and is generated for use by a processing controller, while the reference file is for use by a data reader at the client or user end.

Figure 2:
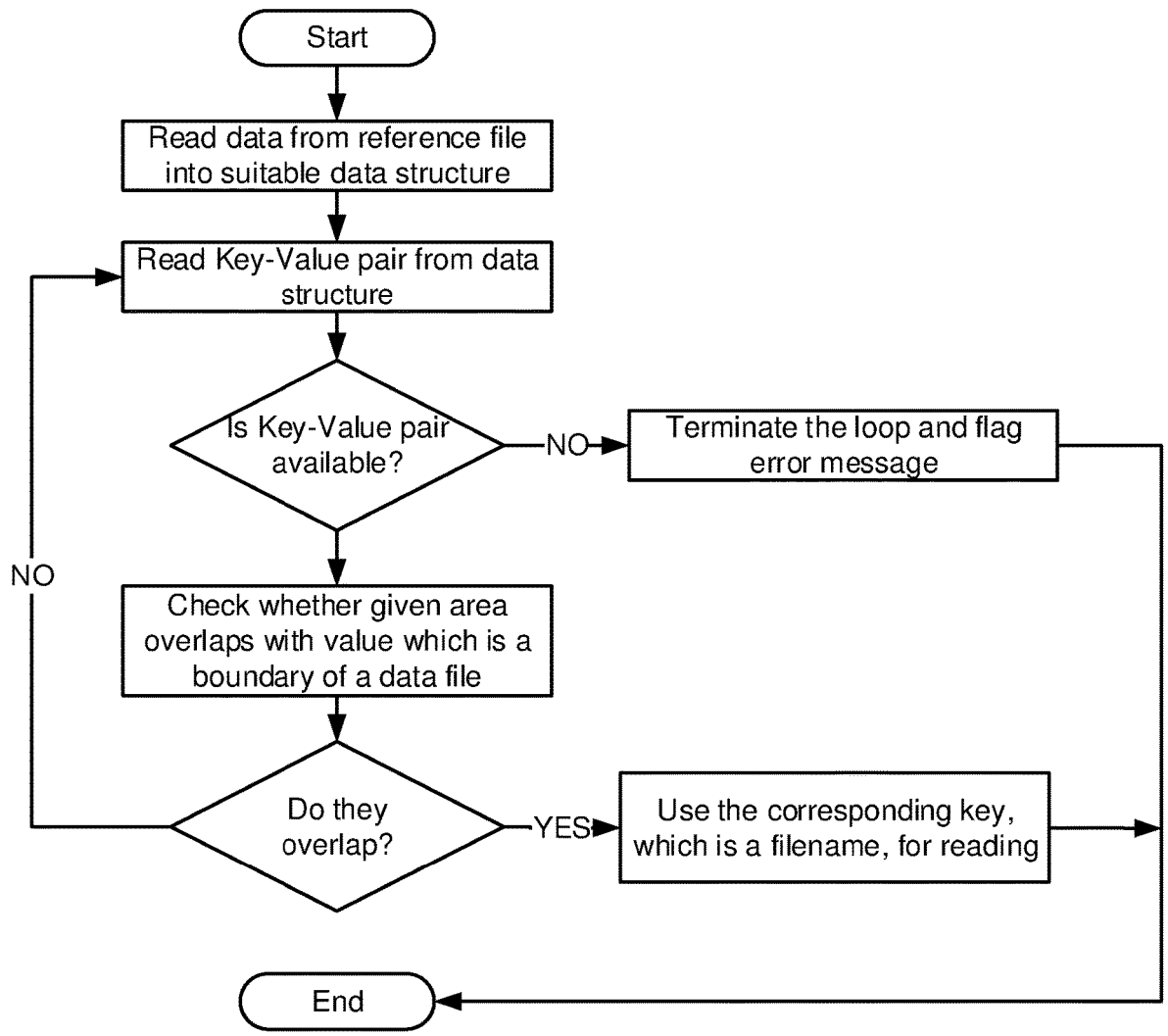
FIG. 2 is a flow diagram illustrating sub-step 2 of step 101 of the method of FIG. 1.

Step 2 is illustrated schematically in FIG. 2.

Figure 3:
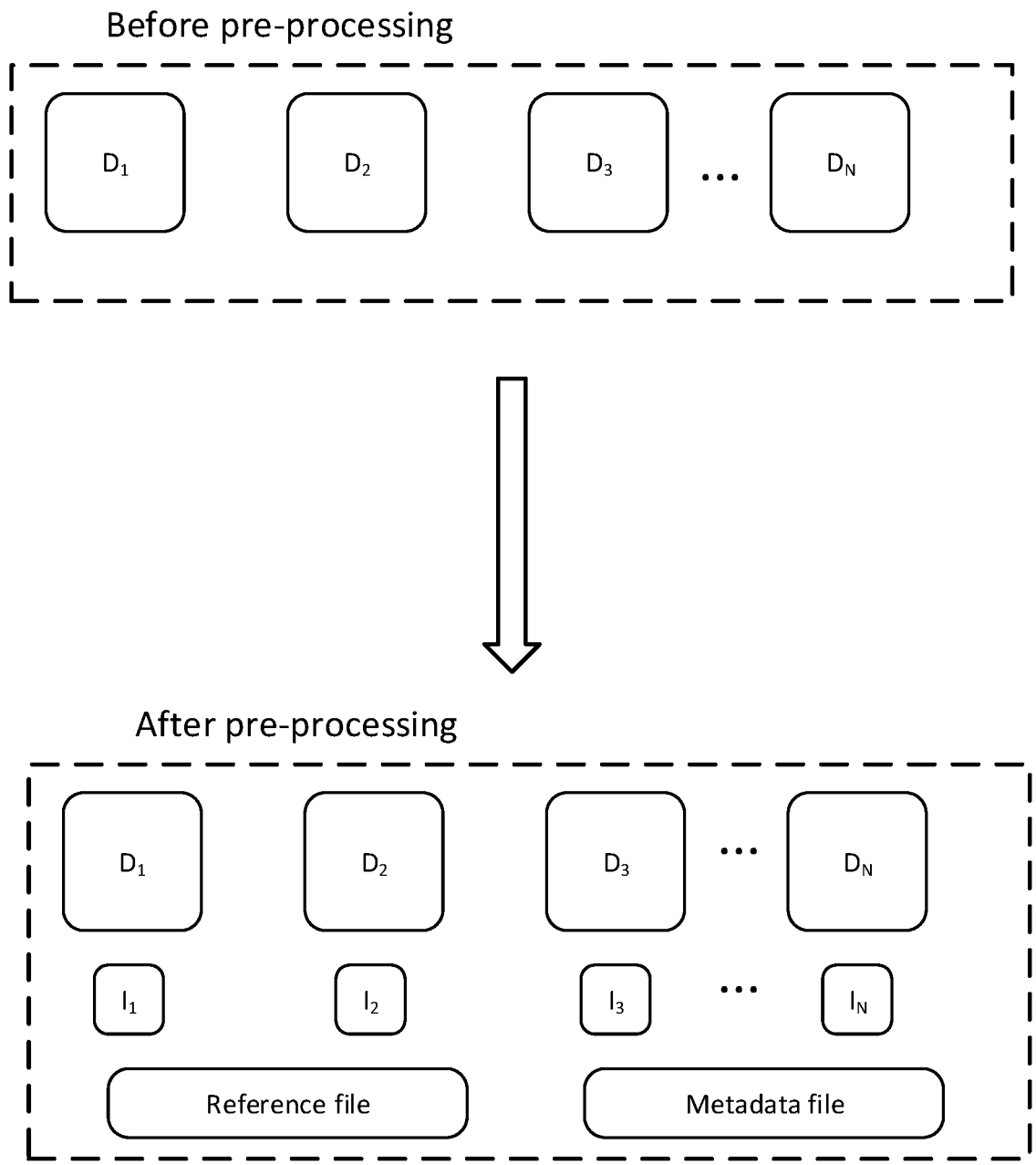
FIG. 3 is a schematic illustration of a dataset before and after pre-processing has been performed.

Step 1 essentially indexes or reindexes the dataset to produce a single reference file for which a data reader is able to access and easily identify the desired files for performing a task. Where the dataset has not already been indexed in the traditional manner, this step can also be performed during this indexing of the data. The output of the pre-processing of the dataset is a single index file for each data file, a single reference file for the dataset and a single metadata file for the dataset. This is illustrated schematically in FIG. 3 in which $D_x$ represent data files and $I_x$ represent index files.

As part of the pre-processing step, the entire dataset is divided into cells (described below). Each cell contains a logical identifier and the total number of elements in it.

Step 1 may be performed initially and the resulting reference file can be leveraged repeatedly by various remotely located data reader work units (computer processors) to simplify selection of data files and to produce the final output required for a given task. In this regard, the generated reference file may be stored in the same data source as the files. However, in some embodiments, the generated reference file may be stored elsewhere provided it can be accessed by the data readers. The data indexing need not be repeated unless the data within the dataset is changed.

In some embodiments, rather than forming an intermediate data structure such as a hash table, the data bounds and filename of each opened file are directly populated into the reference file.

Step 2 is performed in response to a selected subset of data to be analysed. In the case of spatial data, the dataset is selected by inputting desired filter parameters such as geographical area and/or time/date parameters. In the case of time series data, the dataset is selected by inputting start and end times and optionally other filter parameters.

The above approach saves considerable amounts of time by eliminating costly file open, read and close IO operations over the network. The reference file details are read only once and then used for each desired data work unit to produce the final output required.

Broad Scale, Rapid Pre-Classification of Structured Data Using Rasters of Derived and Imported Features At step 102 of method 100, pre-classification of the read data is performed. Although illustrated as a separate step, in practice steps 101 and 102 may be performed simultaneously to reduce overall processing complexity. The pre-classification of the data files generates predefined pre-classification outputs which are associated with the files and added as further values in the metadata file generated at step 101 of method 100.

Classification of structured big data is typically a computationally and memory (RAM) intensive process. It can be hugely beneficial for load balancing and resourcing reasons to be able to estimate the amount of RAM and computation time required to classify a given data area. However, while most structured data indexing systems efficiently store basic information related to each individual data entry, they do not calculate more general metrics across areas of data. The pre-classification step of the present invention leverages these general metrics to speed up the subsequent classification of the data.

For example, in 3D point cloud data such as that derived from LiDAR, the x,y,z location of each point is recorded, but area metrics like local point density, local slope, local height ranges, and variability in intensity of return are not.

In the present invention, area metrics can be calculated using a number of different kernel sizes to produce an n-dimensional matrix (where n-is arbitrary) of feature vectors across a structured dataset. This can include extracting features from the data itself using data processing algorithms or by using complementary information obtained from other, external data sources. For example, in the case of indexing a LiDAR data file, a file containing satellite image data of the same area could be accessed to identify the likelihood of certain terrain features or types being present in the LiDAR data file. Other example classifications include a quality measure of the data within the file, a likelihood of artifacts in the data, average terrain heights/slopes, alignment, point density and standard deviation of all points.

These derived features are generated during the indexing stage of processing at step 102 by running pre-classification algorithms on data cells within each of the data files, so an additional read through of the data is not required. The size of data cells is selected to be sufficiently small so as to capture features of interest within the cells but not so small that the computational complexity of processing the cells is inefficient. By way of example, spatial LiDAR data may be divided into data cells corresponding to areas of 32 m by 32 m of spatial data. The feature vectors are added as additional values which are associated with the particular data cells and associated data files and stored in the reference file for the dataset. These feature vectors are added as metadata to the dataset.

An example table of feature values for four data cells stored in the metadata file is set out below.

| Data cell | Attributes | Value |
| --- | --- | --- |
| Cell 1 | Likelihood of terrain type being urban | 0.9 |
| Cell 1 | Average terrain height | 50 m |
| Cell 1 | List of associated filenames | Filename1 Filename2 |
| Cell 2 | Likelihood of terrain type being urban | 0.8 |
| Cell 2 | Average terrain height | 48 m |
| Cell 2 | List of associated filenames | Filename2 Filename3 |
| Cell 3 | Likelihood of terrain type being urban | 0.3 |
| Cell 3 | Average terrain height | 3 m |
| Cell 3 | List of associated filenames | Filename6 Filename7 |
| Cell 4 | Likelihood of terrain type being urban | 0.4 |
| Cell 4 | Average terrain height | 2 m |
| Cell 4 | List of associated filenames | Filename1 Filename3 |

In practice, each data file will typically include hundreds or thousands of data cells, each with corresponding pre-classifications.

The feature vectors help the computation and RAM requirements for the classification of a given area of structured data to be estimated prior to processing task distribution, thereby enabling more efficient load balancing, better resource utilisation, and improved overall classification performance. This also facilitates a dynamic selection of algorithms and parameter settings to be used to achieve efficient classification of a specific component of the dataset being analysed. In particular, subsequent data classification is improved as some algorithms operate more efficiently on particular data types (such as urban terrain over forest terrain). By way of example, by indexing files on the basis of likely terrain type (urban, forested, desert etc.), subsequent processing can be selectively performed only on a subset of data files that have a high likelihood of being a particular terrain type, thereby reducing overall computational complexity. It will also improve the classification by tuning the algorithm parameters depending of the type of areas.

Polymorphic Plugin Connections

At step 103 of method 100, polymorphic plugin connections are determined for processing the structured data. Plugins are software algorithms usually dedicated to performing a single task. They are typically designed to work in combination with other plugins to provide additional functionality to a higher level software program.

Figure 4:
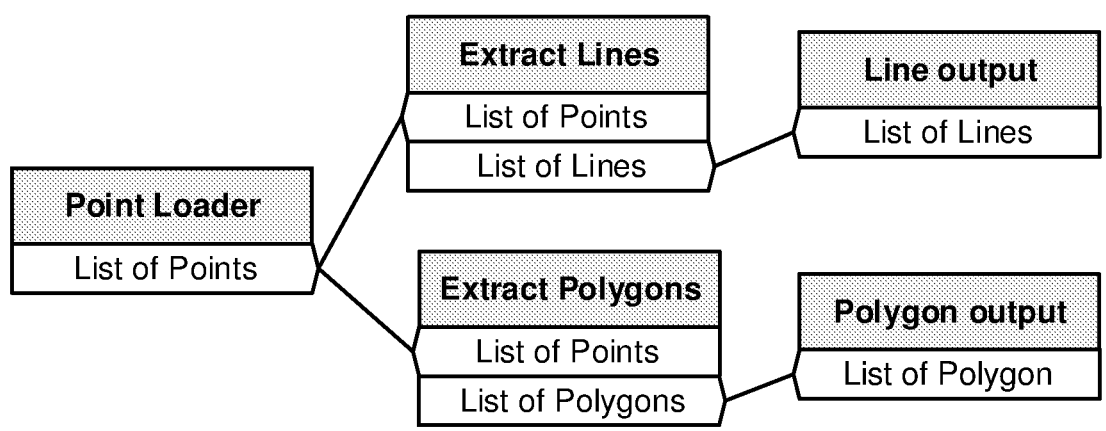
FIG. 4 illustrates an example of a workflow that does not employ the method and system for polymorphic plugin connections.

In a plugin environment, only compatible inputs and outputs are allowed to be connected. This means that if one had, for example, inputs and outputs of type Line and Polygon and there was a desire to be able to write them to a file, in prior art solutions this would typically require the creation of an output-to-file plugin for each type. FIG. 4 illustrates an example non-polymorphic workflow situation where a Line output and a Polygon output plugin are used. This situation requires the software developer to create many plugins for all the different possible data types.

Polymorphism is a component of object-oriented programming and is defined as the characteristic of being able to assign a different meaning or usage to something in different contexts; specifically, it is to allow an entity such as a variable, a function, or an object to have more than one form. The main benefits are simplicity and extensibility. Embodiments of the present invention leverage a technique for achieving polymorphism in the new context of a plugin based distributed computing platform.

Figure 5:
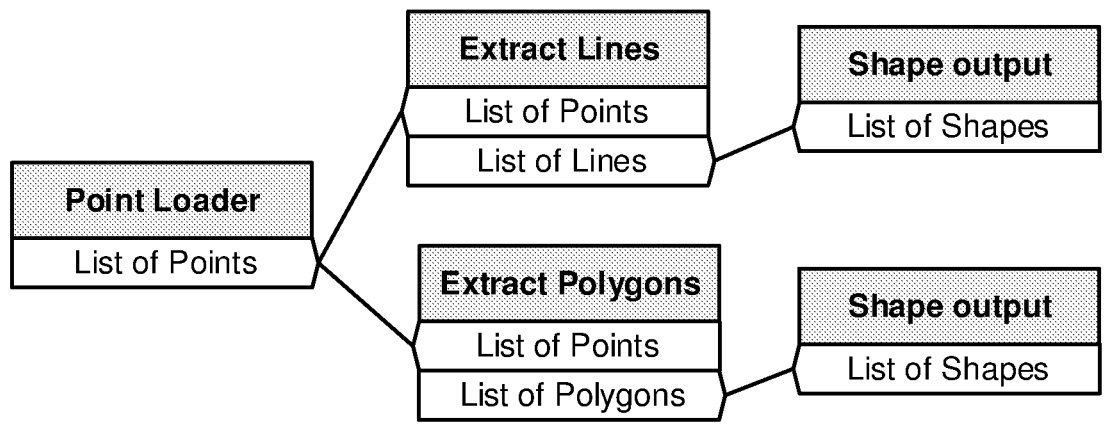
FIG. 5 illustrates an example of a workflow that does employ the method and system for polymorphic plugin connections.

The technique allows connections of two plugins where the output type is a derived type of the input. For example, FIG. 5 shows an example workflow in which it is possible to connect a list of Lines and a list of Polygons to a list of Shapes if Lines and Polygons are derived types of Shape. In this case, the software developer just needs to create one output plugin that will automatically handle all possible current and future developed Shapes, including Lines and Polygons, instead of a new output plugin for every new type of Shape. To enable this, the plugin developer creates polymorphic objects and uses them with the plugin inputs and outputs. In the latter example, the developer of the plugins generating lines or polygon only has to focus on developing the different objects without knowledge of how the shape output plugin will write the shape to a file. In a similar fashion, the shape output plugin does not require knowledge of the type of shape that is input to write the output to a file.

Figure 6:
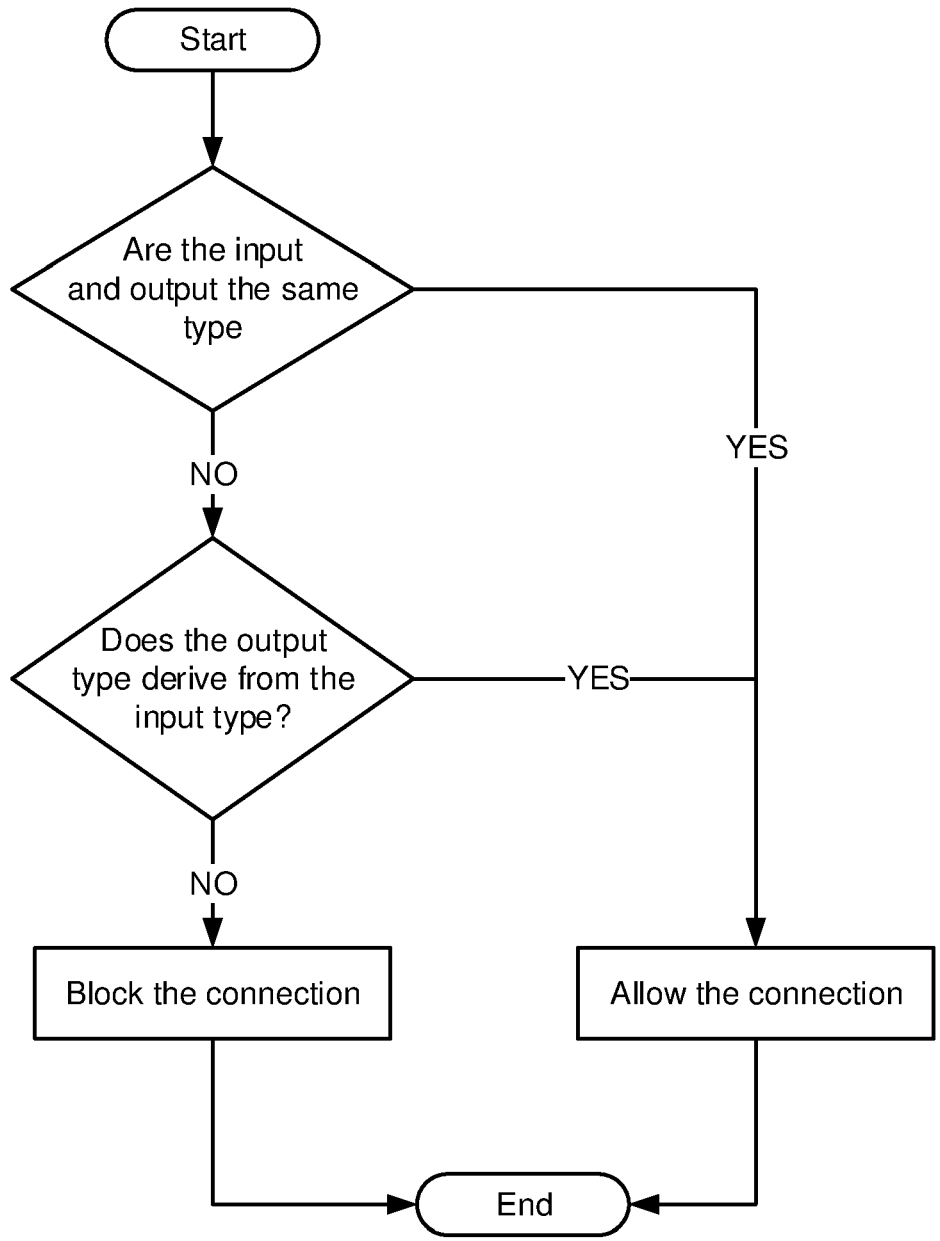
FIG. 6 illustrates a test flow chart for plugin connections illustrating the principle of polymorphic plugin connections.

FIG. 6 shows a test flow chart for plugin connections illustrating the principle of polymorphic plugin connections and how a connection may be allowed or blocked when a user connects an input to an output depending on the object type relationships.

Automatic Workflow Distribution Control

At step 104 of method 100, distribution of workflow is performed based on the plugin connections. This step involves scheduling work units or 'tasks' and sharing resources across multiple computer processors.

Prior art solutions that use distributed computing typically require the user to clearly define the parts that will be distributed on many computers. This is a limiting factor that removes flexibility to the user because the user needs to manually create the batches and can only create one such batch distribution at a time.

Figure 7:
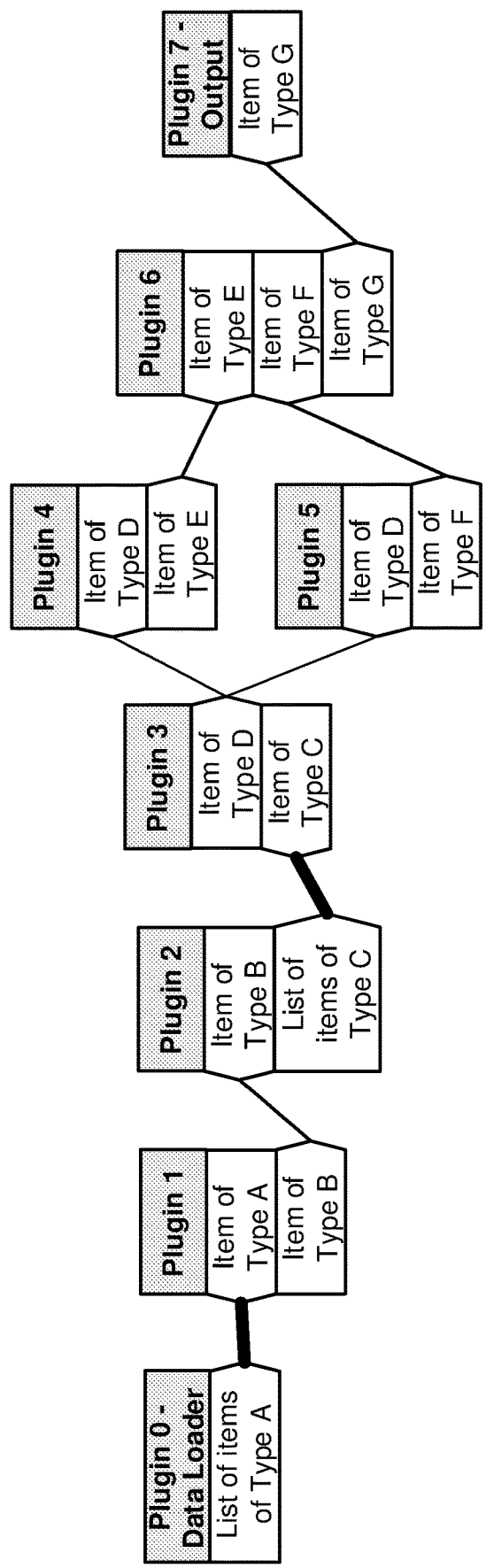
FIG. 7 is an example of a workflow that illustrates the method and system for automatic workflow distribution control.

In the plugin based architecture of the present invention, any time a plugin is connected with an output list of a certain type of object to another plugin input of the same type but an individual item and not a list, a distributed connection is created (bold lines in FIG. 7). When the user executes the workflow and there is a distributed connection, the processing controller creates a list of tasks to process based on the list of items and finds compute nodes to process the right side of the bold connection all in a distributed fashion.

In the case where there are other distributed connections in the workflow as highlighted in FIG. 7, the compute node that is processing the workflow sent by the processing controller will find other compute nodes to process the right side of the second distributed connection. This time, the compute node will act just as if it were a processing controller.

Branches can also be executed in parallel on different cores in one compute node as well as on separate compute nodes. In that case, all downstream plugins wait for their inputs to be valid indicating that all the previous plugins are completed and then run in their own thread.

With the above solution, the plugin creator, or the user managing the workflow, does not have to understand how to distribute their work; it will be done automatically for them. At the same time, the efficient dynamic task allocation step outlined below will be fully utilised automatically.

Efficient Dynamic Task Estimation and Allocation to Compute Nodes

In step 105, dynamic allocation of tasks to connected or networked compute nodes is performed based on the polymorphic plugin connections and workflow distribution.

Generally, very large datasets are, of necessity, divided into smaller pieces of suitable size and then processed in pieces. Each piece of data here is a task for a compute node. In a highly distributed computing environment, it is always difficult to determine the number of tasks to be sent to each compute node. Traditionally a fixed number of tasks are sent to all compute nodes. However, this approach is not efficient, especially when the compute nodes are running on machines with different hardware specifications, or where there is significant variability in the amount of computation required across the dataset to achieve final output.

Consider, by way of example, two compute nodes; Node1 with 8 GB RAM and Node2 with 16 GB RAM and tasks that require 1.5 GB RAM each. In this case, with traditional techniques, the processing controller can send only 5 tasks requiring 7.5 GB RAM in total to both compute nodes. This approach results in an under-utilization of Node2 of approximately 8.5 GB of unused RAM. Node2 can easily accommodate 5 more tasks. If there were a distributed computing facility with a large number of compute nodes with 16 GB or more RAM along with a few compute nodes with 8 GB RAM, the total under-utilization could become unacceptable and significantly impact the performance of the computing facility. In addition to that, compute nodes with less than 8 GB RAM could not be added to such a facility without additional changes as these compute nodes would run out of RAM when sent 5 tasks.

Estimation of the RAM utilisation requirement per task, 1.5 GB RAM in the above example, is itself very difficult to do as it depends strongly on the complexity of the task. Task complexity will vary with factors such as the desired result of the processing, input dataset element density, the nature of the input data, and the number and complexity of algorithms required for the processing.

Consider again an example from 3D point clouds derived from LiDAR and/or imagery to illustrate these points. The task of generating contours from a 3D point cloud may require 0.5 GB/task whereas full point cloud classification may require 1.5 GB/task. Doing a full classification of a 1 km×1 km tile with 4 points/m$^2$ density requires substantially less amount of resources than a 1 km×1 km tile with 16 points/m² density. Data in one task may have only ground points while data in another task may have ground, buildings, water, dense vegetation, etc., points. For the first task, only ground classification related algorithms will be used, while for the other task algorithms related to ground, buildings, water and vegetation will be used. All such factors can substantially affect task memory consumption.

In a highly complex, multi-threaded, distributed computing environment, there should also be an upper limit to the total number of threads processing data at the same time on a computing node. Too many parallel threads can considerably degrade the performance. Hence the processing controller should stop sending tasks to a compute node after the total number of threads goes above a threshold value on that compute node machine.

The data pre-processing described in steps 101 and 102 serves to partially address the above inefficiencies. To further address these inefficiencies, step 105 of method 100 includes the following techniques.

Task List Creation: The processing controller, as a first step, divides the dataset and prepares a task list. The processing controller intelligently calculates the optimal size of the task by looking at the element density in the metadata and any other key indicators that may be chosen. In a 3D point cloud example, if the point density is 4 points/m², the processing controller may generate tasks of size 1 km². However if the point density is 16 points/m², the processing controller may generate tasks of size 0.5 km² based on point density alone. The size of different tasks may be the same or different to maximize resources available.

The processing controller also merges two tasks into a single task as and when required. If the number of data elements in a given task is below a threshold value, the processing controller tries to find the most suitable task from its neighbouring tasks and merges the given small task with it. This reduces the number of tasks and eliminates the overhead required for handling those small tasks.

Estimation of resources required per task: When the processing controller divides the dataset and generates the task list, it calculates the number of elements and computational complexity for each task using the metadata of the dataset. The processing controller then sorts the tasks in descending order of number of elements and computational complexity and sends the top N tasks as pilot tasks to N compute nodes (exactly one task to one compute node for estimation) with the highest computation hardware specifications. While processing the pilot message, the compute node keeps sending status information to the processing controller. Once all the pilot messages are processed (including failed tasks), the processing controller calculates the memory requirement per element for that particular workflow from the status information received from all the compute nodes. Using this memory requirement per element, the processing controller then updates the remaining tasks in the task list with a memory estimation by multiplying the memory requirement per element with the number of elements in that task.

N pilot tasks are used, rather than just one, because the memory required to process tasks can be very different depending of the nature of the data in the task. In order to improve the effectiveness of the estimation, the processing controller sends pilot messages to N compute nodes and uses status information from them, instead of status information from only one compute node.

Task Allocation: Once the processing controller has the task list with the estimated memory requirement for each task, it looks at the compute node status information, particularly available memory capacity. The processing controller picks up the next task from the task list and sends it to the compute node with an available memory capacity that is greater than estimated memory required for that task. It keeps doing this until there are no compute nodes with enough capacity to process the next task. The processing controller then waits for the compute nodes to complete their tasks. As soon as any compute node completes its task, the processing controller sends another task to it as per available memory capacity. If a compute node completes a big task and has enough capacity to process two or more tasks, the processing controller sends multiple tasks to maximize the resource utilization.

The way the processing controller picks the next task from the task list is completely flexible. At the beginning, the processing controller would typically pick tasks from the top of the task list, i.e. the biggest tasks in terms of memory required. However the processing controller can pick tasks from anywhere in the task list to keep the compute node busy all the time. For example, assume NodeA has 8 GB RAM and the processing controller sends to it 5 tasks, each task with 1.2 GB memory requirement, from the top of the task list. After that NodeA will still have 819 MB available. The processing controller then tries to look down the task list to find the biggest task with estimated memory requirement less than 819 MB and sends it to NodeA.

The processing controller also subdivides tasks into smaller tasks as and when required. For example, if the processing controller is only left with tasks with 1.2 GB estimated memory required and all the compute nodes have less than 1 GB available memory capacity, the processing controller cannot send whole tasks to compute nodes as compute nodes will run out of memory. So the processing controller intelligently subdivides tasks into smaller tasks, say two sub tasks each with 0.6 GB memory requirements. At any point of time, the processing controller knows about the available compute node memory capacity. It also knows the number of threads spawned for each task. By looking at this, the processing controller will not send tasks to a compute node after the total number of threads goes above a certain threshold in order to prevent performance degradation.

Automatic Edge Effect Elimination with Minimum Performance Lost

At step 106 of method 100, the primary processing of the data is performed. As part of this processing, edge effect elimination is performed.

Most solutions for distributed computing cut big problems into small pieces (tasks) that fit into individual computing devices. An issue with cutting the problem into pieces is that it creates a discontinuity on the edges of those smaller pieces. To solve this problem, some prior art techniques just process larger pieces of data that overlap each other and then merge the results. This solves part of the problem but it creates some significant performance degradation as a lot of data is processed in the overlapping areas that will then just be discarded. This solution also comes with the risk that the user has not chosen enough overlap to eliminate all edge effects. This is particularly the case where the data is dense and the size of the detected features is comparatively large, for example buildings in geospatial point cloud data.

To eliminate or at least substantially reduce the edge effects while maintaining maximum efficiency, the system disclosed herein calculates the minimum required extra buffer at each step of the workflow. This way, each plugin only processes the buffer that the downstream plugins require. Moreover, once a line of plugins is terminated, memory is automatically released.

Figure 8:
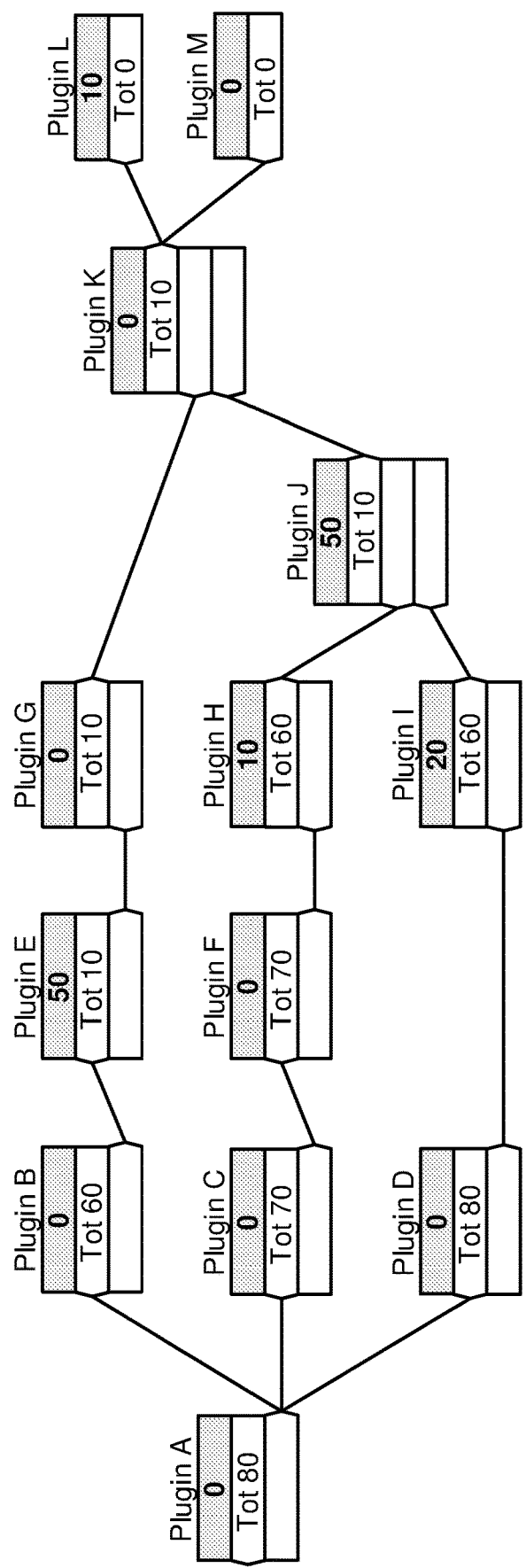
FIG. 8 illustrates a technique for automatic edge effect elimination with minimum performance lost.

FIG. 8 shows how this mechanism works. Here the first number of each plugin represents how much buffer it requires and the second number represents the maximum total buffer of all children plugins. Each plugin is then guaranteed to have enough valid information for processing without edge effects. Memory is automatically released once a line of plugins is terminated. By way of example, assume the workflow is processing geospatial data and assume that the top number represents the buffer in metres required for a plugin to create a valid result in the requested area without edge effects. The developer of the plugin specifies this minimum required buffer for the plugin in question. In FIG. 8, the last two plugins (L and M) require 10 and 0 metres buffer, respectively. Plugin L may, for example, represent an algorithm for estimating an average terrain height over 10 metre tiles of spatial data. When Plugin K is executed, it will make sure that it generates valid results in an area at least 10 metres bigger on all sides than the final area requested so that edge effects associated with averaging are completely eliminated. Similarly, when Plugin D is executed, it will make sure that it generates valid results in a buffer area of at least 80 metres because of Plugin I (20 m)+Plugin J (50 m)+Plugin L (10 m). When a plugin is connected to two or more different paths like Plugin A, it takes the largest sum, in this case Plugin D with 80 metres. Additionally, once Plugin J is complete, the system will release any memory held by Plugins H and I but not Plugin G as Plugin K depends on it. Once Plugin K is finished, the memory held by Plugin G will be released.

This way, the minimum required information is processed at every stage without creating any edge effects and memory consumption is kept to a minimum.

CONCLUSIONS

The method and system for flexible, high performance structured data processing described herein employs six mutually re-enforcing techniques to effectively address the limitations of the prior art:
- Efficient data reading within a specific area from a very big structured dataset—This approach makes data reading from a big dataset very fast and efficient which in turn results in better resource utilization, faster processing speed, and massive scalability. It addresses the file IO performance bottleneck in distributed, high performance processing of structured big data while maintaining full flexibility and maximum resource efficiency. It enables the benefits of the other techniques to fully translate to improved overall performance.
- Broad scale, rapid pre-classification of structured data using rasters of derived and imported features—This method provides various important area metrics, laying the foundation for an optimal implementation of the efficient dynamic task estimation and allocation technique. It improves overall efficiency, resource utilisation, system scalability, and processing performance.
- Polymorphic plugin connections—The flexibility of the automatic workflow distribution control is complemented by this method that allows plugin developers to focus on creation of algorithms and spend less time writing redundant and similar plugins to accommodate all the different types of data. It facilitates rapid and efficient development.
- Automatic workflow distribution control—This approach enables very complex problems with many levels of distribution to work seamlessly for the user in a "one read-one write" architecture. A complex workflow can be built and run rapidly with ease, with the edge effect elimination technique ensuring that all edge effects are automatically taken care of and the efficient dynamic task estimation and allocation technique ensuring that resources are utilised optimally. It provides scalability, high performance, and full flexibility.
- Efficient dynamic task estimation and allocation to compute nodes—This approach makes sure that the computational resources are being utilized at the maximum possible level at any point of time during data processing. It also allows the system to scale very quickly. Hardware with different specifications, right from commodity machines to supercomputers, can be used for data processing.
- Automatic edge effect elimination with minimum performance lost—This technique works synergistically with the efficient dynamic task estimation and allocation method by ensuring data will be processed in seamless blocks with no edge effects at a maximally fast rate. It provides efficiency, scalability, and optimal processing performance.

Together these six techniques constitute a method and system for flexible, high performance structured data processing that is adaptive and jointly optimises processing speed, resource utilisation, flexibility, scalability, and configurability. It is an integrated "one read-one write" solution that is platform agnostic and can fully capitalise on advances in computing technology. It is scalable to massive dataset size while maintaining dataset integrity and minimising processing times. It is able to utilise all available computing resources and automatically adapt to different memory, processing, operating system, and network configurations. It is easily reconfigurable to new applications, new algorithms, new insights, new data formats, and incorporation of $3^{rd}$ party code, and is conducive to rapid prototyping. Hence, it effectively addresses the drawbacks, and offers strong benefits, over prior art techniques.

Interpretation

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A method using high performance computing for flexibly processing a dataset consisting of structured data, the dataset including a plurality of discrete data files, the method including:
    accessing a data source where the dataset is stored;
    pre-processing the dataset to generate:
        a reference file indicating one or more predetermined characteristics of the structured data that are contained within each of the discrete data files; and
        a metadata file indicating one or more data metrics; and upon a selection of a subset of data from the dataset to process:
  defining plugin connections for processing the selection of data;
  dynamically allocating data processing tasks to connected computer nodes; and
  performing data processing on the selection of data; and
  generating an output of the data processing of the selection of data; and
automatically eliminating edge effects on the selection of data by calculating a minimum required extra buffer of data at each plugin.

2. The method according to claim 1 wherein the step of pre-processing the dataset occurs in conjunction with indexing the dataset.

3. The method according to claim 1 wherein the predetermined characteristics include data bounds and associated file names for each of the discrete data files in the dataset.

4. The method according to claim 1, further including the step of pre-classifying the discrete data files including using discrete information from external files to calculate one or more data metrics.

5. The method according to claim 4 wherein the data metrics include a determination of the likelihood of a presence of certain data features in the discrete data files.

6. The method according to claim 4 wherein the data metrics include measures of properties of the data set that will impact the computational complexity of each plugin in the analytical process.

7. The method according to claim 3 wherein the step of pre-processing the dataset includes the steps of:
  i) opening each discrete data file;
  ii) determining the data bounds for each discrete data file; and
  iii) storing the determined data bounds and an associated filename for each discrete data in the reference file.

8. The method according to claim 7 wherein the structured dataset is a dataset of spatial and/or temporal data.

9. The method according to claim 8 wherein the spatial data includes imagery and LiDAR data including point clouds derived there from.

10. The method of claim 1 wherein the buffer associated with each algorithm or sequence of algorithms is released once that algorithm or sequence is terminated.

* * * * *